United States Patent [19]

Sekizawa et al.

[11] 3,932,668

[45] Jan. 13, 1976

[54] COMPOSITION FOR TREATING SWINE SCOUR

[75] Inventors: Yasuharu Sekizawa; Shigeo Seki; Bunzo Nomiya, all of Tokyo; Takemi Koeda, Yokohama; Fumio Kai, Fujisawa; Naotoshi Akai, Kokubunji; Yasushi Yusa; Fuguaki Fukuyasu, both of Yokohama, all of Japan

[73] Assignee: Meiji Seika Kaisha, Ltd., Tokyo, Japan

[22] Filed: Dec. 10, 1974

[21] Appl. No.: 531,415

Related U.S. Application Data

[62] Division of Ser. No. 319,127, Dec. 29, 1972, Pat. No. 3,859,362.

[30] Foreign Application Priority Data

Dec. 28, 1971  Japan.............................. 46-105753

[52] U.S. Cl. ............................................... 424/342
[51] Int. Cl.² ......................................... A61K 31/08
[58] Field of Search ..................................... 424/342

[56] References Cited
OTHER PUBLICATIONS

The Merck Veterinary Manual, 3rd edition, (1967), pp. 462 and 463.

*Primary Examiner*—Sam Rosen
*Attorney, Agent, or Firm*—Sughrue, Rothwell, Mion Zinn & Macpeak

[57] ABSTRACT

Novel alkyl 2,3,3-triiodoallyl ethers useful as disinfectants are provided by an addition reaction of alkyl-3-iodo-2-propinyl ethers with iodine. The starting alkyl-3-iodo-2-propinyl ethers can be prepared by a new process comprising an alkylation of propargyl alcohol with an alkyl sulfate or alkyl sulfonate in the presence of an alkali, followed by monoiodization of the resulting alkyl-2-propinyl ether. This invention also provides a composition comprising alkyl 2,3,3-triiodoalkyl ethers useful as a poultry feed additive having growth increasing effects and for treating swine scours.

1 Claim, No Drawings

COMPOSITION FOR TREATING SWINE SCOUR

This is a Division of application Ser. No. 319,127, filed Dec. 29, 1972, U.S. Pat. 3,859,362.

BACKGROUND OF THE INVENTION

Field of the Invention

The present invention relates to alkyl 2,3,3-triiodoalkyl ethers and processes for preparing the same as well as compositions containing alkyl 2,3,3-triiodoalkyl ethers.

SUMMARY OF THE INVENTION

The inventors have discovered that novel alkyl 2,3,3-triiodo ethers which are useful as excellent feed additives for growing poultry or as agents for treating swine scours. More especially, this invention relates to alkyl 2,3,3-triiodoallyl ethers of the following formula:

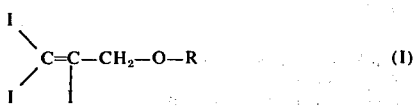
(I)

wherein R is an alkyl group selected from methyl, ethyl, n-propyl and isopropyl groups and to a process for preparing the alkyl 2,3,3-triiodoallyl ethers as well as compositions containing the same.

The alkyl 2,3,3-triiodoallyl ethers of this invention are novel compounds which have a wide antimicrobial spectrum and are useful as disinfectants or germicides, in particular, for treating swine scours and which are excellent feed additives for growing poultry.

These novel compounds are prepared in accordance with this invention by a process which comprises an addition reaction of alkyl-3-iodo-2-propinyl ethers of the following formula:

$$I - C \equiv C - CH_2 - O - R \qquad (II)$$

wherein R is the same as defined with respect to formula (I), with iodine. This process has not been known previously, and the reaction involved is one of the important advantages of the present invention. The addition reaction alone is induced selectively by using the alkyl-3-iodo-2-propinyl ethers of formula (II) as starting materials, and therefore, the final products (I) of high purity can be formed in high yields. The purification of the products can be performed easily on an industrial scale, and moreover, the starting materials are available at low cost.

The present invention further provides a process for preparing alkyl-3-iodo-2-propinyl ethers of formula (II) by reacting propargyl alcohol with an alkyl sulfate or alkyl sulfonate in the presence of an alkali to form an alkyl-2-propinyl ether of the following formula:

$$HC \equiv C - CH_2 - O - R \qquad (III)$$

wherein R is the same as defined in formula (I), and then monoiodizing the alkyl-2-propinyl ether.

DETAILED DESCRIPTION OF THE INVENTION

Some of the compounds of formula (II) are known compounds, but most of them are novel compounds which can be prepared easily by a new method to be described. For example, methyl-3-iodo-2-propinyl ether (R=methyl in formula (II)), one of the starting compounds of formula (II), can be prepared by the known method disclosed in R. Lespieau, Ann. Chim. (Paris), Vol. II, page 269 (1897), but it is not commercially advantageous.

Accordingly, in another aspect of this invention, there is provided a process for preparing alkyl-3-iodo-2-propinyl ethers of formula (II), which comprises reacting propargyl alcohol with an alkyl sulfate or alkyl sulfonate in the presence of an alkali to form an alkyl-2-propinyl ether of the following formula:

$$HC \equiv C - CH_2 - O - R \qquad (III)$$

wherein R is the same as defined with respect to formula (I), and then monoiodizing the alkyl-2-propinyl ether.

Unlike the conventional method, this new process does not go through a propargyl halogenide or dihalopropyl-methyl ether as an intermediate, but yields the alkyl-2-propinyl ether by alkylation of propargyl alcohol. Specifically, the alkyl-2-propinyl ether is obtained in a very high yield by reacting propargyl alcohol in the form of an aqueous solution or in the absence of solvent with an alkyl sulfate or alkyl sulfonate in the presence of an alkali hydroxide.

The compound of formula (III) can also be obtained by reacting a propargyl halogenide or a propargyl ester of sulfonic acid with a corresponding alcohol in the presence of alkali, but this method is drastically disadvantageous as compared with the process of this invention.

The alkyl-2-propinyl ether of formula (III) obtained can be purified by distillation prior to iodization or may be used without further purification by distillation. If the inorganic salt formed during the reaction is precipitated, an appropriate organic solvent or water may be added to the reaction mixture prior to iodization in an amount sufficient to dissolve the salt. A solution of an alkali metal hydroxide or alkaline earth metal hydroxide in water or a lower alcohol, e.g., lower alkanol such as methanol, ethanol, propanol and iso-propanol is added to the alkyl-2-propinyl ether in an amount of 1 to 2 moles of the hydroxide per one mole of the ether, and while the mixture is being stirred at near room temperature, an aqueous solution of 1 - 1.2 moles of iodine or an aqueous mixture of iodine with potassium iodide is usually added in an amount of from 1 to 1.2 moles of iodine per 1 mole of the ether. Iodine and potassium iodide may be used in an equimolar amount. This induces the monoiodization of the alkyl-3-iodo-2-propinyl ether of the formula (II) in a high yield.

Alternatively, the compound of formula (II) may be obtained by a process which involves treating the compound of formula (III) with a copper complex salt, a copper salt or cuprous hydroxide to convert it to its cupric acetylide and monoiodizing it with iodine to form the compound of formula (II).

In these processes, the same results can be achieved by using an iodonium salt solution comprising iodine and potassium iodide instead of iodine. Generally, the solvent may be water or a lower alcohol.

According to the above methods, the selective monoiodine substitution of the acetylenic hydrogen of the compound of formula (III) is carried out in a high yield. Iodine is very much liable to add to such an acetylenic bond, and intrinsically the addition reaction predominates to form the corresponding alkyl-2,3-iodo-allyl ether. However, as a result of activating the terminal carbon of the acetylenic bond by a basic catalyst such as an alkali hydroxide or copper ions or copper complex ions in the above-mentioned processes, the first-stage monoiodine substitution reaction takes place selectively, whereas the formation of an alkyl-2,3-iodo-allyl ether, which is the outcome of the undesirable side-reaction, can be reduced.

The monoiodine substitution reaction described above can also be performed by reacting the compound of formula (II) with iodine in liquid ammonia; or by using an organic amine such as morpholine or triethyl amine as the basic catalyst.

The novel alkyl-2,3,3-triiodoallyl ether of formula (I) is prepared by adding a solution of iodine or an iodonium salt to the compound of formula (II) which is either purified, for example, by distillation under reduced pressure, or in the crude form as a solution in a suitable solvent, and stirring the mixture. This process can be carried out at any temperature, but temperatures in the range of from room temperature to a boiling point of the solvent used are preferred. The iodine or an iodinium salt is generally used in an amount of from an equimolar amount to a molar excess amount with respect to the compound of formula (II).

The solvent suitable for use in this reaction is a compound which does not react with iodine. Examples of the solvent are chloroform, dichloromethane, carbon tetrachloride, dioxane, lower alcohols, acetic acid or water.

The iodine addition reaction is promoted even at low temperatures (below room temperature) by exposing the reaction mixture to the irradiation of light during the reaction, and this can lead to the shortening of the time required until the completion of the reaction. The light irradiation also minimizes a decomposition reaction that may occur during heating, and frequently, the product is obtained in a very good yield.

The use of an excess of iodine (usually, about 1.1 to 1.5 times) can also shorten the time required until the completion of the reaction, but does not so much affect the heat decomposition reaction. The end of the reaction can be determined by titrating the unreacted iodine with a sodium thiosulfate standard solution.

After the reaction, excess iodine is removed by adding an aqueous solution of sodium thiosulfate, shaking the mixture and removing the aqueous layer. The final product can be obtained by washing the solvent layer with water, concentrating and crystallizing it, and finally recrystallizing it from a suitable solvent. When the product is a liquid, the remaining oily material is purified by distillation under reduced pressure or by alumina chromatography to isolate it as a pure substance.

The compounds of this invention having the formula

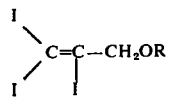

wherein R is as defined above, can be prepared by an alternative procedure. Propargyl alcohol is reacted with iodine in the presence of an alkali hydroxide in an aqueous solvent which is inert to iodine, for example, aqueous methanol, aqueous ethanol and the like to produce 2,3,3-triiodoallyl alcohol in a single step. The resulting triiodoallyl alcohol is generally sparingly soluble in the above described aqueous solvent, but is easily soluble in dipolar aprotic solvents and can be alkylated with an appropriate alkylating agent in the dipolar aprotic solvents such as dimethylformamide, dimethylsulfoxide and the like to obtain the desired product. Also, the above triiodoallyl alcohols may be converted first into their reactive derivatives, i.e., 2,3,3-triiodoallyl halogenides or pseudo halogenides such as p-toluenesulfonate or methanesulfonate in the presence of an alkali, and the resulting halogenides or pseudo halogenides can then be alkylated by treating with an alkali metal alkoxide or subjecting to alcoholysis in the presence of an alkali hydroxide to obtain the desired products.

The composition of this invention comprises an alkyl 2,3,3-triiodo-allyl methyl ether as an active ingredient, which is useful as a feed additive for growing poultry or as an agent for treating the swine scours.

The 2,3,3-triiodo-allyl methyl ether which is a typical compound of this invention has a melting point of 43.5° to 44.5°C. and possesses a wide range of anti-microbial activity against Gram-positive and Gram-negative bacteria as shown in Table 1.

Table 1

| Antimicrobial spectrum of 2,3,3-triiodo-allyl methyl ether | |
|---|---|
| Bacteria | Minimum inhibition concentration (mcg/ml) |
| Staphylococcus aureus 209-p | 6.25 |
| Streptococcus haemolyticus cook | 12.5 |
| Diplococcus pneumoniae Type I | 10-1 |
| Bacillus subtilis PCI 219 | 10-1 |
| Salmonella typhi O-901-W | 3.12 |
| Escherichia coli Communis | 10-1 |
| 0-16 | 6.25 |
| 0-20 | 0.78 |
| 0-78 | 3.12 |
| 0-83 | 12.5 |
| 0-135 | 3.12 |
| 0-139 | 12.5 |
| 0-142 | 6.25 |
| Mycobacterium tuberculosis H37RV | 10-1 |
| El-tor vibrio | 3.12 |
| Tricophyton asteroides | 1.56 |
| Aspergillus fumigatus Saito | 3.12 |
| Candida albicans Totuka | 3.12 |
| Cryptococcus neoformans 301 | 0.78 |

This compound has low toxicity against poultry and swine as demonstrated by $LD_{50}$ values on mice which are shown in Table 2.

Table 2

| Toxicity ($LD_{50}$) against mice | |
|---|---|
| Oral administration | more than 1000 mg/Kg |
| Intraperitoneal administration | 50 – 100 mg/Kg |

As is well known, $LD_{50}$, or the median lethal dose, is the dose which is fatal to 50% of the test animals, and the larger the $LD_{50}$ is, the lower the toxicity of the test material is.

The 2,3,3-triiodo-allyl-methyl ether is prepared, for example, by an addition reaction of 3-iodo-2-propinyl-methyl ether with iodine.

It has now been found that 2,3,3-triiodo-allyl-methyl ether is a feed additive having excellent growth effects on poultry which does not overlap pharmaceuticals for treating human diseases, is hardly absorbed by the digestive tract of poultry, is free from residue build-up and does not have cross resistance.

It has been the practice in the poultry production industry to raise poultry with feeds having incorporated therein small amounts of various antibiotics for the purpose of preventing diseases and increasing poultry growth. However, many of the antibiotics effectively used for these purposes are primarily intended for treating human diseases. It has been pointed out that prolonged use of such antibiotics in poultry feeds contributes to the evolution of resistant strains of bacteria which when evacuated from the poultry together with excrement, may cause environmental pollution, which in turn may result in problems in treating human diseases. Even those antibiotics not applied to humans, if they have a cross resistance effect, are undesirable for the same reason. It has also been pointed out that when such an antibiotic remains in the edible parts of poultry, it can possibly cause allergies in the human body. Steroid hormones, on the other hand, were once added to poultry feeds for the purpose of growth stimulation, but were prohibited when it was found that their residues built up and exerted adverse effects on the human body.

Feed additives for growth purposes desirably have effects on clusters of bacteria normally present in the intestines when they pass through the digestive tract with the feeds. It is clearly seen from Table 1 that 2,3,3-triiodo-ally-methyl ether is effective against such bacteria.

It is also desirable that growth effects are obtained by adding the additive in a small amount to the poultry feeds, but that even large amounts of the additive do not exert adverse effects. The safety of the feed additive according to the present invention is clearly seen from Table 2. An $LD_{50}$ value of more than 1000 mg per kilogram of the body weight of a mouse in oral administration shows that 2,3,3-triiodo-allyl-methyl ether is an excellent poultry feed additive. On the other hand, an $LD_{50}$ of 50–100 mg per kilogram of the body weight of a mouse in intraperitoneal administration means relatively low toxicity. It is due to the difficulty of absorption of 2,3,3-triiodo-allyl-methyl ether from the intestinal wall in the digestive tract that the $LD_{50}$ in oral administration is 10-20 times or more as great as that in intraperitoneal administration. If there is no absorption from the intestinal wall, it naturally follows that the feed additive does not develop a build-up of residue in the edible portions, such as the muscles, of poultry.

The amount of 2,3,3-triiodo-allyl-methyl ether to be added to the feed is usually 1 to 200 g per ton of the feed, and the additive uniformly mixed with the feed.

As suggested at the outset, in another aspect of this invention, there is provided an agent for treating swine scours comprising utilizing 2,3,3-triiodo-allyl-methyl ether as an active ingredient, which compound does not overlap pharmaceuticals for treating human diseases, does not have cross resistance, is hardly absorbed by the digestive tract of swine and which does not cause a build-up of residue in the system of the swine.

It is well known that serious scours occur in the breeding of young swine which causes great damage to swine production. Antibiotics for humans which are effective against pathogenic bacilli coli have been used for the prevention and treatment of swine scours, but this has posed a problem of public hygiene because of the propagation of resistant strains of the bacteria. The 2,3,3-triiodo-allyl-methyl ether is free from these defects, and can be effectively and safely used for treating swine scours.

In use, 2,3,3-triiodo-allyl-methyl ether in crystal form is formed into a fine powder, and either coated with gelatin to a content of about 10% of the ether powder or diluted 10-fold with lactose. It is used in an amount of about 10 mg or more per kilogram of the body weight of the swine in one dosage, and may be increased according to the case. Usually, it is administered twice on the first day, and thereafter, once a day for 3 to 4 days. By this method of treatment, the disease is generally cured in about 5 days.

The following Examples specifically illustrate the present invention.

EXAMPLE 1

Preparation of methyl-2,3,3-triiodoallylether

16 Grams of 3-iodo-2-propinyl-methyl ether was dissolved in 80 ml. of chloroform, and 25.4 g of iodine powder was added. The mixture was heated under reflux for 3 hours at a bath temperature of 70°C., and then allowed to stand overnight at room temperature. It was further heated at 70°C and shaken with the gradual addition of a 1N aqueous solution of sodium thiosulfate until the color of the iodine disappeared. The aqueous layer which was formed was removed. The chloroform layer was washed with water, and by evaporating off the solvent at reduced pressure, about 30 g of crude crystals were obtained. The crude crystals were recrystallized from methanol to provide 29.5 g (yield 79%) of almost colorless pillar- to plate-like crystals having a melting point of 43.5° to 44.5°C.

Elemental analysis values $C_4H_5OI_3$ (449.8); Calculated: C 10.68, H 1.12; Found: C 9.62, H 1.31

NMR ($CCl_4$), $\delta$ (ppm); 3.32 (singlet, 3H, $CH_3O$—), 4.04 (singlet, 2H, $-CH_2-O-$)

(Note: The $\delta$ values of NMR are those obtained using tetramethylsilane as an internal reference.)

EXAMPLE 2

Preparation of ethyl-2,3,3-triiodoallyl ether

16 Grams of ethyl-3-iodo-2-propinyl ether (b.p. 50°–52°C./4 mmHg) was dissolved in 100 ml. of chloroform, and 20 g of iodine was added. With stirring, white light was irradiated to the mixture using a 500 W tungsten-filament lamp for photographic use. During the reaction, the reaction mixture was maintained at a temperature below 10°C. by ice cooling. When the color of the iodine almost disappeared, a 1N aqueous solution of sodium thiosulfate was added to the reaction mixture and the mixture was stirred to remove unreacted iodine. The chloroform layer was washed with water and dried with anhydrous sodium sulfate. The solvent was then evaporated off to give 32 g of an oily material which was found to be almost pure ethyl-2,3,3-triiodoallyl ether (R=ethyl in formula (I)). Distillation of this oily material at reduced pressure provided a liquid having a boiling point of 108° to 110°C. at 0.27 mmHg.

NMR ($CDCl_3$), $\delta$ (ppm), 1.36 (triplet, J=7 cps, 3H,—$CH_3$), 4.19 (singlet, 2H, $-O-CH_2-$).

EXAMPLE 3

Preparation of isopropyl-2,3,3-triiodoallyl ether 2.8 Grams of isopropyl-3-iodo-2-propinyl ether (b.p. 63°–65°C/6mmHg) was dissolved in 30 ml. of chloroform and 3.2 g of iodine was added thereto. The mixture was then subjected to the same reaction and post-treatment procedures as in Example 2. Finally, chloroform was evaporated off from the chloroform extract to provide 4.65 g (yield 77.5%) of crystals. Recrystallization of the crystals from methanol yielded 3.25 g of colorless crystals having a melting point of 43.5° to 44°C.

Elemental analysis values $C_6H_9OI_3$ (477.85); Calculated: C 15.08; H 1.90; Found: C 15.07, H 1.82

EXAMPLE 4

Preparation of n-propyl-2,3,3-triiodoallyl ether 8.4 Grams of n-propyl-3-iodo-2-propinyl ether (b.p. 69°–70°C/5.2 mmHg) was dissolved in 50 ml. of chloroform and 9.5 g of iodine. The mixture was subjected to the same reaction and post-treatment procedures as in Example 2. Finally, chloroform was evaporated off from the chloroform extract to give 17.3 g of an oily material. This material was dissolved in methanol to crystallize it. There was obtained 12.8 g of light yellow crystals having a melting point of 33.5 to 34°C.

Elemental analysis values $C_6H_9OI_3$ (477.85); Calculated: C 15.08, H 1.90; Found: C 15.05, H 1.89

EXAMPLE 5

Preparation of 3-iodo-propinyl-methyl ether 44.8 Grams of propargyl alcohol and 93.4 g of 96% potassium hydroxide were dissolved in 80 ml. of water. While the aqueous solution obtained was being maintained at about 15°C with stirring, 100.8 g of dimethyl sulfate was added dropwise thereto over the course of about one hour, and then the mixture was further heated at 60°C. for one hour. A distillation tube was attached to the reactor used. The mixture was heated at about 60°C. with stirring, and the distillate was collected. Finally, the bath temperature was raised to about 80°C., and all the liquid that distilled out was collected. The yield was 61 g, and the distillate had a boiling point of 58° to 65°C. This product was identified as methyl propargyl ether (purity about 78%, yield 96%) containing a small amount of methanol by means of gas-chromatography and NMR spectrum.

NMR (CDCl$_3$) $\delta$ (ppm): 4.07 (doublet, J=2 cps, 2H, —CH$_2$—O—), 3.36 (singlet, 3H, —O—CH$_3$), 2.48 (triplet, J=2 cps, 1H, HC≡C—). Further, the NMR spectrum showed a signal at 3.27 ppm based on the methyl group proton of methanol.

7 Grams of the methyl-propargyl ether (containing about 22% of methanol) obtained above was admixed with a solution of 11.2 g of potassium hydroxide in 20 ml. of water. While the mixture was being thoroughly stirred at room temperature, 25.4 g of iodine was added in several portions. The mixture was stirred at room temperature for about one hour. The product was extracted with 50 ml. of chloroform. The chloroform layer was washed with water, and dehydrated with anhydrous sodium sulfate. Chloroform was then distilled off to afford 15 g of a colorless transparent liquid which was almost pure 3-iodo-2-propinyl-methyl ether (R=methyl in formula (II)). Purification of the liquid by distillation under reduced pressure provided 13 g (yield 85.5%) of a liquid having a boiling point of 39-40°C. at 2 mmHg as a pure product.

By treating propargyl alcohol under the same conditions with the corresponding reagents, there were obtained ethyl-3-iodo-2-propinyl ether (b.p. 50°–52°C/4 mmHg, yield 84.5%), isopropyl-3-iodo-2-propinyl ether (b.p. 63°–65°C/6 mmHg, yield 51.0%), and n-propyl-3-iodo-2-propinyl ether (b.p. 69°–70°C/5.2 mmHg, yield 74.5%). (The above yield values are on a molar basis based on propargyl alcohol).

EXAMPLE 6

Preparation of methyl 2,3,3-triiodoallyl ether 1.15 g of 2,3,3-triiodoallyl iodide (m.p. 80°–81°C, prepared by the addition reaction of 1,3-diiodopropyne and iodine) was dissolved in 35 ml of methanol, and to the mixture was then added 2 ml of 1.05N KOH/methanol followed by allowing the mixture to stand at a temperature of 30°C for 24 hours. The mixture was then concentrated under reduced pressure at a temperature below 40°C, and 10 ml of water was added thereto followed by standing overnight at 0°C. An oil first formed and gradually crystallized to give 890 mg of crude crystals. Recrystallization from methanol yielded 496 mg (52% yield) of a pale yellow crystalline product having a melting point of 42°–43.5°C.

EXAMPLE 7

Preparation of methyl 2,3,3-triiodoallyl ether 8.72 g of 2,3,3-triiodoallyl alcohol (m.p. 152°–153°C, prepared by reacting propargyl alcohol with iodine in the presence of an alkali) was dissolved in 20 ml of dimethylformamide, and 3.8 g of dimethyl sulfate and solution of 1.3 g of sodium hydroxide in 5 ml of water were successviely added dropwise with stirring over 1 hour, while maintaining the temperature of the reaction mixture in the range of 15° to 20°C during the addition by external cooling with water. After completion of the addition, the mixture was stirred at a temperature of 25°C for 30 minutes, and 60 ml of ice-water was added to precipitate a crystalline product. The thus obtained crystals were separated by filtration, and washed first with water and then with a small amount of cold methanol to give 7.5 g (83.3% yield) of the product having a melting point of 42°–43°C.

EXAMPLE 8

Preparation of methyl 2,3,3-triiodoallyl ether 4.36 g of 2,3,3-triiodoallyl alcohol was dissolved in 10 ml of dimethylformamide, and 4.26 g of methyl iodide and a solution of 0.8 g of sodium hydroxide in 3 ml of water were successively added dropwise with stirring and ice-cooling over a period of about 30 minutes. After completion of the addition, the mixture was stirred for 5 hours at a temperature of 25°C and 50 ml of ice-water was added thereto to precipitate a crystalline product. The thus obtained crystals were separated by filtration, and washed first with water and then with a small amount of cold methanol to give 3.9 g (86.7% yield) of a pale yellow crystalline product having a melting point of 42°–43°C.

EXAMPLE 9

Preparation of methyl 2,3,3-triiodoallyl ether 5.9 g of 2,3,3-triiodoallyl p-toluenesulfonate (m.p. 114°–116°C, prepared by addition reaction of 3-iodo-2-propinyl p-toluenesulfonate with iodine or by reaction of p-toluenesulfonyl chloride and 2,3,3-triiodoallyl alcohol in the presence of an alkali) was dissolved in 10 ml of dimethylformamide, and 0.55 g of sodium methoxide was added thereto while ice-cooling and stirring. The mixture was then stirred for a period of 30 minutes under ice-cooling and then for a period of 1 hour at 25°C, and thereafter 60 ml of ice-water was added thereto to precipitate a crystalline product. The thus obtained product was separated by filtration, and washed first with water and then with a small amount of cold methanol to give 4.1 g (91% yield) of pale yellow crystals having a melting point of 42°–43°C.

methyl ether had been premixed with 100 times its weight of defatted rice bran. Using this mixed feed, 20 starting chicks were raised for 10 weeks. The increased body weights are shown in Table 3.

TABLE 3

| Amount Added (g/ton of feed) | 2nd week | 4th week | 6th week | 8th week | 10th week | Weight Increase Index * |
|---|---|---|---|---|---|---|
| 1 | 120.4 | 357.4 | 682.4 | 1084.4 | 1329.7 | 109.9 |
| 5 | 125.9 | 362.1 | 706.2 | 1099.3 | 1408.4 | 116.4 |
| 10 | 147.6 | 388.0 | 764.0 | 1150.7 | 1512.1 | 125.0 |
| 20 | 120.4 | 350.2 | 647.3 | 990.7 | 1303.1 | 109.7 |
| 50 | 124.3 | 359.4 | 671.3 | 1030.5 | 1382.2 | 114.3 |
| 100 | 128.2 | 349.8 | 663.1 | 946.7 | 1223.7 | 101.2 |
| 200 | 106.5 | 343.2 | 686.3 | 1039.6 | 1298.3 | 107.3 |
| Not Added | 116.4 | 341.2 | 611.6 | 926.7 | 1209.7 | 100.0 |
| Procaine Pencillin G, 20 g | 127.3 | 374.6 | 664.2 | 1012.9 | 1324.0 | 109.5 |

* Index on the basis of the non-added group (100.0).

EXAMPLE 10

Preparation of 2,3,3-triiodo-allyl-methyl ether

16 Grams of 3-iodo-2-propinyl-methyl ether was dissolved in 80 ml. of chloroform, and 25.4 g of iodine powder was added. The mixture was heated under reflux for 3 hours at a bath temperature of 70°C, and then allowed to stand overnight at room temperature. It was further heated at 70°C, and shaken with the gradual addition of a 1N aqueous solution of sodium thiosulfate until the color of the iodine disappeared. The aqueous layer was removed. The chloroform layer was washed with water, and by evaporating off the solvent at reduced pressure, about 30 g of crude crystals were obtained. The crude crystals were recrystallized from methanol to afford 29.5 g (yield 79%) of almost colorless pillar- to plate-like crystals having a melting point of 43.5° to 44.5°C.

Elemental analysis values $C_4H_5OI_3$ (449.8); Calculated: C 10.68, H 1.12; Found: C 9.62, H 1.31

NMR (CCl$_4$), δ (ppm): 3.32 (singlet, 3H, CH$_3$—O—); 4.04 (singlet, 2H, —CH$_2$—O—)

(Note: The δ values of NMR are those obtained using tetramethylsilane as an internal reference.)

EXAMPLE 11

An amount of 2,3,3-triiodo-allyl-methyl ether as shown in Table 3 was uniformly mixed into one ton of a poultry compound feed. The 2,3,3-triiodo-allyl- It is seen from Table 3 that all of the groups which were fed with the feed containing 2,3,3-triiodo-allyl-methyl ether showed an increase in body weight after 10 weeks as compared with the group which was not given 2,3,3-triiodo-allyl-methyl ether. For example, it was clear even to the naked eye that the chicks fed with the feed containing 2,3,3-triiodo-allyl-methyl ether in an amount of 10 g per ton were bigger than those fed with the feed which did not contain this additive. That the addition of great quantities of 2,3,3-triiodoallyl-methyl ether did not cause a decrease in body weight is evidence that this particular compound is little absorbed by the digestive tract and does not have side-effects.

EXAMPLE 12

2,3,3-triiodo-allyl-methyl ether was finely divided in a mortar, and then diluted 10-fold with lactose. A field clinical test was performed using this formulation to treat the scours of 41 pigs. The formulation was administered orally twice on the first day and once a day for the next 3 to 4 days. The results are shown in Table 4. In this table, the symbols +++, ++, + and — have the following meanings:

+++ : watery feces
++ : muddy feces
+ : soft feces
— : normal feces

TABLE 4(a)

| No. | Sex | Age (days) | Body weight (Kg) | Single Dosage (mg of pure powder/Kg of body weight) | 1st day | 2nd day | 3rd day | 4th day | 5th day | Evaluation |
|---|---|---|---|---|---|---|---|---|---|---|
| 1 | m | 21 | 5 | 60 | ++ | — | | | | Cured |
| 2 | m | 21 | 5 | 60 | + | — | | | | " |
| 3 | f | 21 | 5 | 60 | +++ | — | | | | " |
| 4 | m | 26 | 7 | 43 | + | ++ | + | — | | " |
| 5 | f | 26 | 7 | 43 | + | ++ | — | | | " |
| 6 | m | 26 | 7 | 43 | + | ++ | — | | | " |
| 7 | m | 7 | 3 | 100 | ++ | + | + | — | | " |
| 8 | f | 7 | 3 | 100 | + | +++ | + | — | | " |
| 9 | f | 13 | 4 | 75 | ++ | + | — | | | " |
| 10 | f | 13 | 4 | 75 | + | ++ | — | | | " |
| 11 | m | 12 | 2 | 150 | +++ | + | — | | | " |
| 12 | m | 12 | 2 | 150 | +++ | + | + | + | — | " |
| 13 | m | 27 | 8 | 100 | ++ | — | | | | " |
| 14 | m | 28 | 8 | 100 | ++ | — | | | | " |
| 15 | f | 22 | 5 | 60 | + | +++ | — | | | " |
| 16 | m | 10 | 4 | 75 | ++ | +++ | — | | | " |
| 17 | f | 10 | 3 | 100 | +++ | + | — | | | " |

TABLE 4(a)-continued

| No. | Sex | Age (days) | Body weight (Kg) | Single Dosage (mg of pure powder/Kg of body weight) | 1st day | 2nd day | 3rd day | 4th day | 5th day | Evaluation |
|---|---|---|---|---|---|---|---|---|---|---|
| 18 | f | 10 | 3 | 100 | ++ | + | — | | | " |
| 19 | m | 10 | 4 | 75 | + | — | | | | " |
| 20 | f | 15 | 3 | 100 | + | + | — | | | " |
| 21 | f | 15 | 3 | 100 | + | + | — | | | " |
| 22 | f | 9 | 2.5 | 120 | ++ | — | | | | " |
| 23 | f | 9 | 1.5 | 200 | ++ | — | | | | " |
| 24 | m | 9 | 1.5 | 200 | ++ | — | | | | " |
| 25 | f | 8 | 2 | 150 | +++ | — | | | | " |
| 26 | m | 34 | 5.5 | 35 | ++ | ++ | — | | | " |
| 27 | m | 55 | 10.1 | 50 | +++ | +++ | ++ | ++ | — | " |
| 28 | m | 54 | 6.1 | 41 | +++ | +++ | ++ | + | — | " |
| 29 | m | 56 | 13.8 | 51 | +++ | ++ | — | | | " |
| 30 | m | 35 | 4.1 | 49 | ++ | + | — | | | " |
| 31 | f | 35 | 4.3 | 47 | ++ | + | — | | | " |
| 32 | f | 35 | 4.1 | 49 | ++ | + | — | | | " |
| 33 | m | 34 | 6 | 42 | ++ | + | — | | | " |
| 34 | f | 26 | 2.7 | 56 | +++ | +++ | ++ | ++ | — | " |
| 35 | m | 55 | 10 | 50 | ++ | + | — | | | " |
| 36 | f | 28 | 4 | 50 | +++ | +++ | ++ | — | | " |
| 37 | m | 28 | 5 | 50 | ++ | + | — | | | " |
| 38 | f | 40 | 5.3 | 47 | ++ | ++ | — | | | " |
| 39 | m | 38 | 6.5 | 46 | ++ | ++ | — | | | " |
| 40 | m | 39 | 5.9 | 42 | ++ | ++ | — | | | " |
| 41 | m | 38 | 6.7 | 44 | ++ | ++ | — | | | " |

TABLE 4(b)

Comparative Experiment
Effect of Kanamycin Sulfate against Scours of Swine (Control)

| No. | Sex | Age (days) | Body weight (Kg) | Single Dosage (mg/Kg of body weight) | 1st day | 2nd day | 3rd day | 4th day | 5th day | Evaluation |
|---|---|---|---|---|---|---|---|---|---|---|
| 1 | m | 17 | 2.0 | 150 | ++ | ++ | + | — | | Cured |
| 2 | f | 17 | 2.1 | 145 | ++ | ++ | ++ | + | — | Cured |
| 3 | m | 17 | 2.2 | 135 | + | + | + | + | — | Cured |
| 4 | m | 18 | 2.3 | 130 | +++ | ++ | ++ | + | — | Cured |
| 5 | f | 18 | 2.3 | 130 | + | — | | | | Cured |
| 6 | f | 16 | 4.0 | 75 | +++ | | | | | Deaths |
| 7 | m | 22 | 2.7 | 110 | ++ | — | | | | Cured |
| 8 | f | 22 | 2.5 | 120 | ++ | ++ | + | — | | Cured |
| 9 | f | 19 | 3.0 | 100 | +++ | ++ | + | — | | Cured |
| 10 | m | 19 | 2.6 | 115 | ++ | + | + | — | | Cured |
| 11 | f | 15 | 2.6 | 115 | + | + | + | — | | Cured |
| 12 | m | 15 | 2.3 | 130 | ++ | ++ | ++ | ++ | + | Discontinued |
| 13 | f | 15 | 2.4 | 125 | ++ | — | | | | Cured |
| 14 | f | 15 | 3.0 | 100 | + | + | + | — | | Cured |
| 15 | m | 16 | 3.0 | 100 | + | — | | | | Cured |
| 16 | f | 19 | 2.8 | 105 | ++ | — | — | | | Cured |
| 17 | f | 23 | 4.6 | 65 | + | — | | | | Cured |
| 18 | m | 23 | 3.0 | 100 | ++ | ++ | + | + | — | Cured |
| 19 | f | 23 | 4.5 | 67 | + | — | | | | Cured |
| 20 | f | 24 | 3.5 | 85 | ++ | +++ | ++ | ++ | ++ | Discontinued |
| 21 | m | 7 | 20 | 150 | ++ | ++ | + | + | + | Discontinued |
| 22 | f | 9 | 3.0 | 100 | ++ | ++ | ++ | + | + | Discontinued |
| 23 | m | 15 | 5.0 | 60 | ++ | ++ | + | + | — | Cured |
| 24 | m | 15 | 5.0 | 60 | ++ | + | + | — | | Cured |
| 25 | f | 12 | 4.0 | 75 | ++ | +++ | ++ | — | | Cured |
| 26 | m | 12 | 4.0 | 75 | + | ++ | + | — | | Cured |

The results shown in Table 4 demonstrate the superior effect of 2,3,3-triiodo-allyl-methyl ether against the diarrhea of swine.

While the invention has been described in detail and with references to specific embodiments thereof, it will be apparent to one skilled in the art that various changes and modifications can be made therein without departing from the spirit and scope thereof.

What we claim is:

1. A composition for treating the diarrhea of swine consisting essentially of an effective amount of 2,3,3-triiodo-allyl-methyl ether and a pharmaceutically acceptable carrier.

* * * * *